W. WATSON.
MICROMETER GAGE.
APPLICATION FILED JULY 8, 1916.

1,283,997.

Patented Nov. 5, 1918.

INVENTOR:
William Watson,
By Albert H. Bake,
ATTY:

UNITED STATES PATENT OFFICE.

WILLIAM WATSON, OF TRENTON, NEW JERSEY, ASSIGNOR TO RALPH H. ROSENFELD, TRUSTEE, OF CLEVELAND, OHIO.

MICROMETER-GAGE.

1,283,997.  Specification of Letters Patent.  Patented Nov. 5, 1918.

Application filed July 3, 1916. Serial No. 108,175.

*To all whom it may concern:*

Be it known that I, WILLIAM WATSON, a citizen of the United States, residing at Trenton, in the county of Mercer and State of New Jersey, have invented a certain new and useful Improvement in Micrometer-Gages, of which the following is a full, clear, and exact description, reference being had to the accompanying drawings.

This invention relates to linear gages for use in machine work, and has for its general object the provision of a simple efficient tool including a micrometer measuring device, and adapted to be used in many ways and under a wide variety of conditions arising in machine shop practice.

A more specific object is to so construct the gage that it may comprise but a few simple parts whereby it may be cheaply manufactured, and is not liable to get out of order.

In carrying out my invention I provide a gage having axially alined members adapted to be longitudinally adjusted to measure distances by means of a micrometer attachment. The gage has a body portion adapted to stand on plane surfaces or on cylindrical surfaces in such a manner as to aline the axis of the gage with the axis of the cylindrical surface, or fit and be attached to the ways or shears of a lathe whereby it may act as a stop for the carriage, providing for accurate adjustments of the position of the carriage and correspondingly definite amounts of movement or depths of cut to be taken by the tool.

My invention is hereinafter more fully described in connection with the drawings, and its essential characteristics are summarized in the claims.

Figure 1:
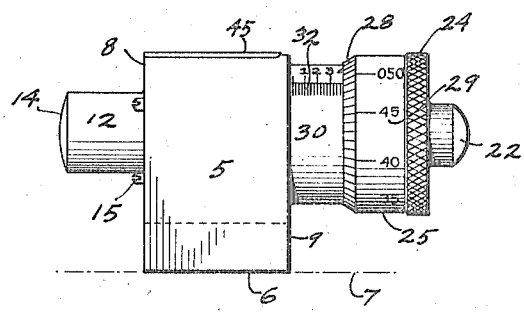
Figure 2:
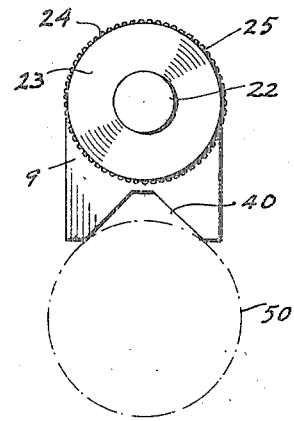
Figure 3:
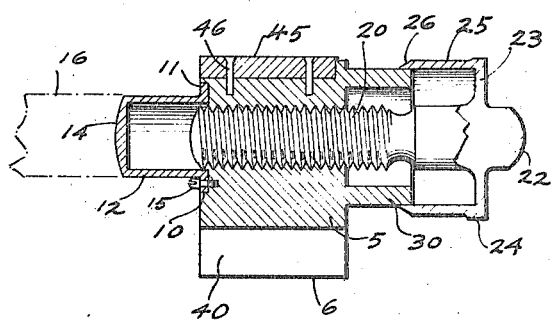
Figure 4:
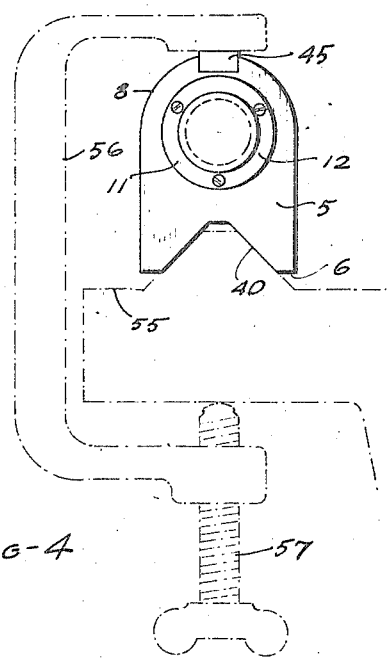

In the drawings, Figure 1 is a side elevation of my micrometer gage; Fig. 2 is an end elevation of the same; Fig. 3 is a vertical substantially axial section through the gage; and Fig. 4 is an elevation of the end opposite that shown in Fig. 2. In the above figures, Fig. 1 illustrates the device in a position resting on a plane; Fig. 2 illustrates its use on a cylindrical surface, and Fig. 4 illustrates its use on the guides or ways of a lathe or planer or like structure.

Referring to the drawings by numerals, 5 indicates a body member having flat plane surfaces 6 adapted to rest on any plane, as indicated by the broken line 7. The body portion is shown as having parallel end surfaces 8 and 9. In the surface 8 is provided a circular depression 10 in which is seated an outwardly extending flange 11 of a hollow distance member 12, shown as a bonnet having a convex outer end 14 forming an abutment adapted to rest against any surface to be measured from. The flange 11 is shown as removably secured in the depression 10 by screws 15 or other suitable means, thus permitting the short distance piece 12 to be changed for other distance pieces of any desired length extending outwardly, as indicated by broken lines at 16.

In axial alinement with the distance piece 12 is a threaded opening shown as extending through the body 5 and adapted to receive a screw 20, the inner end of which may enter the hollow member 12 and the outer end of which is provided with a convex abutment 22 adapted to engage a surface or tool whose distance from the body or the end of the member 12 is to be determined.

Rigid with the screw 20 is an outwardly extending disk-like portion 23 having a knurled surface 24 at its periphery whereby the screw may be turned to vary the distance between the ends 22 and 14.

Extending outwardly from the surface 9 of the body 5 is a rigid cylindrical extension 30, the outer surface of which is slidably and closely embraced by a cylindrical flange or skirt 25 integral with the disk 23 and the outer face of the inner end of which is beveled, as shown at 26, and provided with an annular row of spaced graduation marks 28. These marks may be numbered at intervals, as shown at 29, on the outer surface of the skirt 25. On the surface of the extension 30 is a linear row of suitably numbered graduations indicated at 32, which may be read in conjunction with the graduations on the skirt to determine the relative position of the screw with relation to the body. Thus, by these graduations, the relation between the head of the screw and the body 5 may be determined as well as the distance between the ends 14 and 22, whereby the tool may be used for practically all purposes as an inside caliper in addition to the other uses herein set forth; for example, the tool may be readily used for measuring the inside diameter of piston rings, bores of pistons, etc.

In the lower portion of the body is a V-shaped groove having sides 40 lying in planes parallel to the axis of the screw. This groove is adapted to position the device on cylindrical surfaces or on the ways of a lathe, planer or other tool, as will be hereinafter described.

To provide for clamping the body of the gage to a surface which it may fit, without injuring the body portion, I have provided a hardened tool steel member 45, shown as seated in a suitable cavity in the upper side of the body and secured by rivets or like members, indicated at 46. The upper surface of this member 45 is preferably a plane surface parallel with the surfaces 6, and the outer plane of the member 45 is such a distance from the axis of the screw that the device may rest on this plane or be positioned by it allowing the axis of the distance members to stand closer to such plane under conditions where this is desirable. It will be noted that, by reason of the weight of the body portion and the center of gravity of the gage being above the base thereof, the gage may stand on a plane or convex surface without danger of tipping, which adds greatly to the convenience of using the gage.

It will be seen from the foregoing description that I have provided a simple efficient measuring device which is adapted for many uses, a few of which will be hereinafter described to illustrate the purpose of my invention. It is frequently very desirable in machine work to measure distances between shoulders or between grooves being formed by a planer, shaper or like tools, and under such circumstances it is desirable to have the gage positioned parallel to a plane. Thus the surfaces 6 of the body portion may rest upon a plane just formed by the tool, or upon the bed or table of the shaper, planer or milling machine. The gage may be used to advantage on surface plates, such as are used for "laying out" work.

The sides of the groove 40 being in planes parallel to the axis of the distance pieces, provides for positioning the axis of the gage parallel with the axis of a cylindrical member by resting thereon, as indicated in Fig. 2, the cylindrical surface being shown in broken lines at 50. The sides of the cylindrical surface on which this groove may position the gage may vary widely. This feature is very useful in lathe work and is an advantage on boring machines, drill press work and the like where the groove may position the gage either on the spindle of a machine or on work operated upon.

In lathe work it is frequently desirable to move the carriage longitudinally of the ways a definite distance, thus so positioning the tool as to eliminate a number of trial cuts. For example, if it is found that a cut of ten thousandths of an inch is necessary to bring the surface operated on down to size, the gage may be clamped on the ways and the head 22 of the screw set against the tool carriage and then turned back ten thousandths (or any other desired number), the carriage then moved until it abuts the head, thus positioning the tool to take the finishing cut.

The groove in the body of my gage is preferably so shaped that it may fit the ways or shears of a lathe, indicated in broken lines at 55, and the gage may be clamped in such a position by any convenient device. For example, I have shown a C-clamp 56, having one portion engaging the member 45 and its screw 57 engaging the under side of the ways. This is simply an example of many uses, as the device may be clamped not only on the ways of a lathe, but also on those of a shaper or planer or on the cross head of a planer, whether such cross head is provided with raised shears or whether it presents a flat surface with which the surfaces 6 may coöperate. The sides of the body 5 are flat and parallel, so that the tool may be laid on its side and clamped, should the nature of the work render this desirable.

I have found in practice that my gage is capable of a large variety of uses in machine work, in addition to the above examples, and that it is convenient and durable, having no parts liable to get out of order.

Having thus described my invention, what I claim is:

1. In a device of the character described, the combination of a metal block having a base supporting surface with a longitudinal groove in it, said block having a threaded opening through its upper portion about an axis parallel with the supporting surface and having on one end of the block a cylindrical extension concentric with the axis of the screw threaded opening, a screw threaded into said opening and having a head provided with an outstanding cylindrical skirt overhanging the cylindrical extension of the block, said skirt being provided with circumferential graduations coacting with longitudinal graduations on the extension, and a bonnet secured to the other face of the block in axial alinement with the screw and furnishing a distance piece and a housing for the projecting end of the screw.

2. In a device of the character described, the combination of a block having a threaded opening extending entirely through it from one side to the other and parallel with the top and bottom faces, an integral sleeve concentric with the axis of the threaded opening on one side of the block, a separate hollow bonnet having a closed outer end and an external annular flange at its inner end, said flange abutting and being removably secured to the other side of the block in axial alinement with the screw-threaded opening, a screw occupying said opening and having an enlarged hollow head providing a cylindrical skirt closely overhanging said sleeve, the sleeve being provided with longitudinal graduations and the edge of the skirt with circumferential graduations.

In testimony whereof, I hereunto affix my signature.

WILLIAM WATSON.

Witnesses:
 GRACE DORSETT,
 OLIVE CAULDERELL.

Copies of this patent may be obtained for five cents each, by addressing the "Commissioner of Patents, Washington, D. C."